(12) United States Patent
Martin (10) Patent No.: US 8,151,853 B2
(45) Date of Patent: Apr. 10, 2012

(54) ROTARY LAYING ARM COMPRISING AN ON-BOARD THREAD FEED MEANS

(75) Inventor: Pascal Martin, Corent (FR)

(73) Assignees: Michelin Recherche et Technique S.A., Granges-Paccot (CH); Societe de Technologie Michelin, Clermont-Ferrand (FR)

( * ) Notice: Subject to any disclaimer, the term of this patent is extended or adjusted under 35 U.S.C. 154(b) by 86 days.

(21) Appl. No.: 12/679,477

(22) PCT Filed: Sep. 12, 2008

(86) PCT No.: PCT/EP2008/062172
§ 371 (c)(1),
(2), (4) Date: Jul. 12, 2010

(87) PCT Pub. No.: WO2009/037202
PCT Pub. Date: Mar. 26, 2009

(65) Prior Publication Data
US 2010/0282415 A1 Nov. 11, 2010

(30) Foreign Application Priority Data
Sep. 20, 2007 (FR) ...................................... 07 06651

(51) Int. Cl.
*B29D 30/16* (2006.01)
*B29C 70/32* (2006.01)
(52) U.S. Cl. ......... 156/397; 156/117; 156/439; 156/441
(58) Field of Classification Search .................. 156/117, 156/177, 181, 439, 441, 538
See application file for complete search history.

(56) References Cited

U.S. PATENT DOCUMENTS

| | | | |
|---|---|---|---|
| 3,894,906 A | 7/1975 | Pearce et al. | |
| 4,804,436 A * | 2/1989 | Debroche et al. | 156/441 |
| 5,951,815 A | 9/1999 | Debroche | |
| 5,971,050 A * | 10/1999 | Debroche | 156/397 |

FOREIGN PATENT DOCUMENTS

| EP | 0 248 301 | 12/1987 |
|---|---|---|
| WO | WO 2005/075180 | 8/2005 |

* cited by examiner

*Primary Examiner* — Geoffrey L Knable
(74) *Attorney, Agent, or Firm* — Cozen O'Connor (57) ABSTRACT

Device for manufacturing a reinforcement from a thread laid directly in its final place by casting lengths of the said thread onto a receiving surface, the said device comprising a feed means (200) for feeding the thread (1) from a source of thread (10), a rotary assembly comprising a rotary guide (2) of axis rr' fixed to a hollow shaft (20, 205) constituting the axis of rotation (RR') of the said guide (2) so that the outer radial end (21) of the said guide (2) is directed substantially radially with respect to the axis of rotation of the hollow shaft (RR'), the said guide receiving the thread (1) that comes from the said feed means via its central end (22) that is the opposite end to the said outer radial end (21), the said thread leaving via the said outer radial end (21), the said feed means controlling the linear speed at which the thread advances inside the said rotary guide (2), means (13, 131) for rotating the hollow shaft, and means (31) for cutting the thread, acting on the thread in such a way as to part off one length for each revolution of the said rotary guide (2). The said feed means comprises a motorized pulley (200), borne by the hollow shaft, the circumference of which is tangential to the axis (rr') of the rotary guide (2), and about which pulley the thread is wound before it directly enters the inlet (22) of the rotary guide (2) when the device is in operation.

13 Claims, 7 Drawing Sheets

ROTARY LAYING ARM COMPRISING AN ON-BOARD THREAD FEED MEANS

RELATED APPLICATIONS

This is a U.S. national stage under 35 USC §371 of application No. PCT/EP2008/062172, filed on Sep. 12, 2008.

This application claims the priority of French application Ser. No. 07/06651 filed Sep. 20, 2007, the content of which is hereby incorporated by reference.

FIELD OF THE INVENTION

The invention relates in particular to the manufacture of tires and relates more specifically to the manufacture of reinforcements.

BACKGROUND OF THE INVENTION

The prior art already discloses a method of manufacture in which such reinforcements are manufactured directly on the green tire from a continuous thread, by casting the said thread in the manner of a whip, rather than as previously in the form of plies which are incorporated as the tire is built.

The term thread is to be understood in the very broad sense, encompassing a monofilament, a multifilament, a cord or a folded yarn or an equivalent assembly, and irrespective of the textile or metallic material of which the thread is made or the treatment it may undergo, for example a surface treatment to encourage it to bond closely with rubber, or even a rubberizing treatment surrounding the said thread with a layer of rubber to allow it to adhere directly to the support as it is cast.

Figure 1:
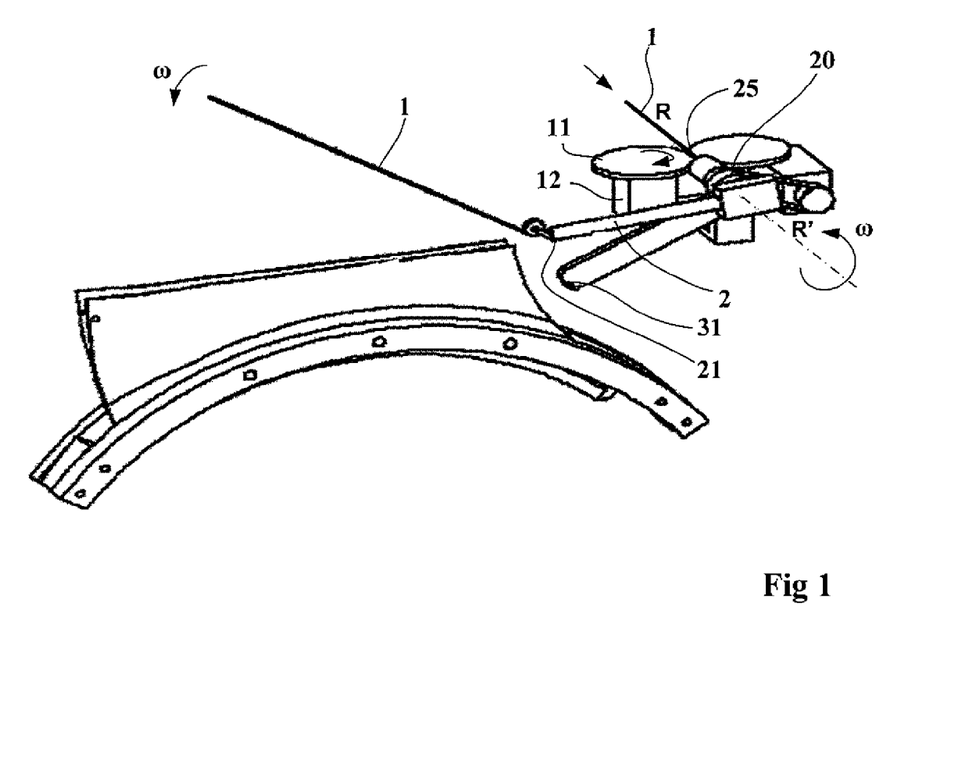
FIG. 1 depicts a schematic view of a laying device according to the prior art.

A device such as this is described in publication EP 248 301. FIG. 1 illustrates the main components that make up this type of apparatus.

The thread 1 is introduced into the device from a feed source (not depicted). The apparatus casts lengths of thread onto a receiving surface which may be formed indifferently either by the crown of a green tire or alternatively by a separate support annulus or alternatively a flat surface.

The said device comprises:
- a feed means 11 for feeding the thread 1 from a source of thread,
- a rotary guide 2 fixed to a hollow shaft 20 constituting the axis of rotation RR' of the said guide, so that the outer radial end 21 of the rotary guide is directed substantially radially with respect to the axis of rotation RR', the said guide 2 receiving the thread 1 that comes from the said feed mean via the central end 25 of the hollow shaft which it enters following a path that coincides with the axis of rotation RR', the said thread leaving via the said outer radial end 21, the said feed means controlling the linear speed at which the thread advances along the said rotary guide 2,
- means for rotating the rotary assembly comprising the hollow shaft and the said rotary guide at a given speed ω,
- means 31 for cutting the thread and acting on the thread in such a way as to part off one length of thread for each revolution of the said rotary guide.

More specifically, the invention is aimed at the thread feed means. This feed means is intended, each time the rotary guide makes one revolution, to deliver to the inlet of the said rotary guide a given quantity of thread that comes from an external source such as, for example, a spool.

The feed means, according to the known prior art, is formed of drive pulleys 11 the axis of rotation of which is perpendicular to the axis of the thread 1. The pulleys are arranged in such a way that the thread is aligned precisely on the axis of rotation RR' of the rotary assembly as the thread enters the hollow shafts 20. The drive pulleys are rotated by a motor 12 at a controlled speed so as to confer upon the thread a linear feed speed equal to the length of a length of thread each time the rotary guide effects one complete revolution about the axis RR'. The feed means is mounted on a stand that is fixed in relation to the rotary guide, and as a general rule positioned in the immediate vicinity of the inlet 25 of the hollow shaft.

According to this known prior art, the thread, which at the inlet 25 follows a path that coincides with the axis of rotation RR', passes from the hollow shaft 20 into the rotary guide 2 via a right-angle bend.

The thread is driven towards the outlet 21 under the combined effect of centrifugal force, which has the tendency to extract it, and of the action of the pulleys 11 of the feed means which have the effect of pushing it. Hence, the path of the thread inside the hollow tube and the rotary guide is relatively easy to control when use is being made of threads of a metallic nature which can experience a certain compression without "buckling". However, it is found that textile threads are substantially more difficult to use inasmuch as the thread has difficulty in negotiating the bend between the hollow shaft and the rotary guide because of the forces of friction against the internal wall of the guide and of the bend. The thread then folds over on itself, blocking the guide and jamming the installation.

SUMMARY OF THE INVENTION

It is an object of the invention to eliminate this problem.

This and other objects are attained in accordance with one aspect of the invention directed to a device for manufacturing a reinforcement from a thread laid directly in its final place by casting lengths of the thread onto a receiving surface, the device comprising a feed means for feeding the thread from a source of thread; a rotary assembly comprising a rotary guide of axis rr' fixed to a hollow shaft constituting an axis of rotation of said guide so that an outer radial end of said guide is directed substantially radially with respect to the axis of rotation of the hollow shaft, said guide receiving the thread that comes from said feed means via its central end that is the opposite end to said outer radial end, the thread leaving via said outer radial end, said feed means controlling a linear speed at which the thread advances inside said rotary guide; means for rotating the hollow shaft; means for cutting the thread, acting on the thread in such a way as to part off one length for each revolution of the said rotary guide; wherein said feed means comprises a motorized pulley, borne by the hollow shaft, the circumference of which is tangential to the axis of the rotary guide, and about which pulley the thread is wound before it directly enters the inlet of the rotary guide when the device is in operation.

One solution according to an embodiment of the invention is to fit at least one motorized pulley, borne by the hollow shaft, the circumference of which is tangential to the axis of the radially extending part of the rotary guide, and around which pulley the thread is wound before it directly enters the inlet of the rotary guide when the device is in operation. What is meant here by directly is the fact that there is no mechanical element that comes into contact with the thread between the motorized pulley and the inlet to the rotary guide.

The motorized pulley is given a rotary movement able to confer upon the thread the speed that corresponds to the length of one length of thread per revolution of the rotary guide so as to control the speed at which the thread advances through the device and act as a feed means.

This arrangement therefore allows the thread to be drawn from the thread storage means through the inlet into the device along the axis of the hollow shaft until it enters the rotary guide, and allows the thread to be delivered directly to the inlet of the rotary guide avoiding the presence of a bend between the hollow tube and the rotary guide. Friction inside the rotary guide alone is minimal enough not to disrupt the passage of the thread inside the said guide, making it possible for textile threads to be used without experiencing the above-mentioned disadvantages.

DETAILED DESCRIPTION OF THE DRAWINGS

Figure 2:
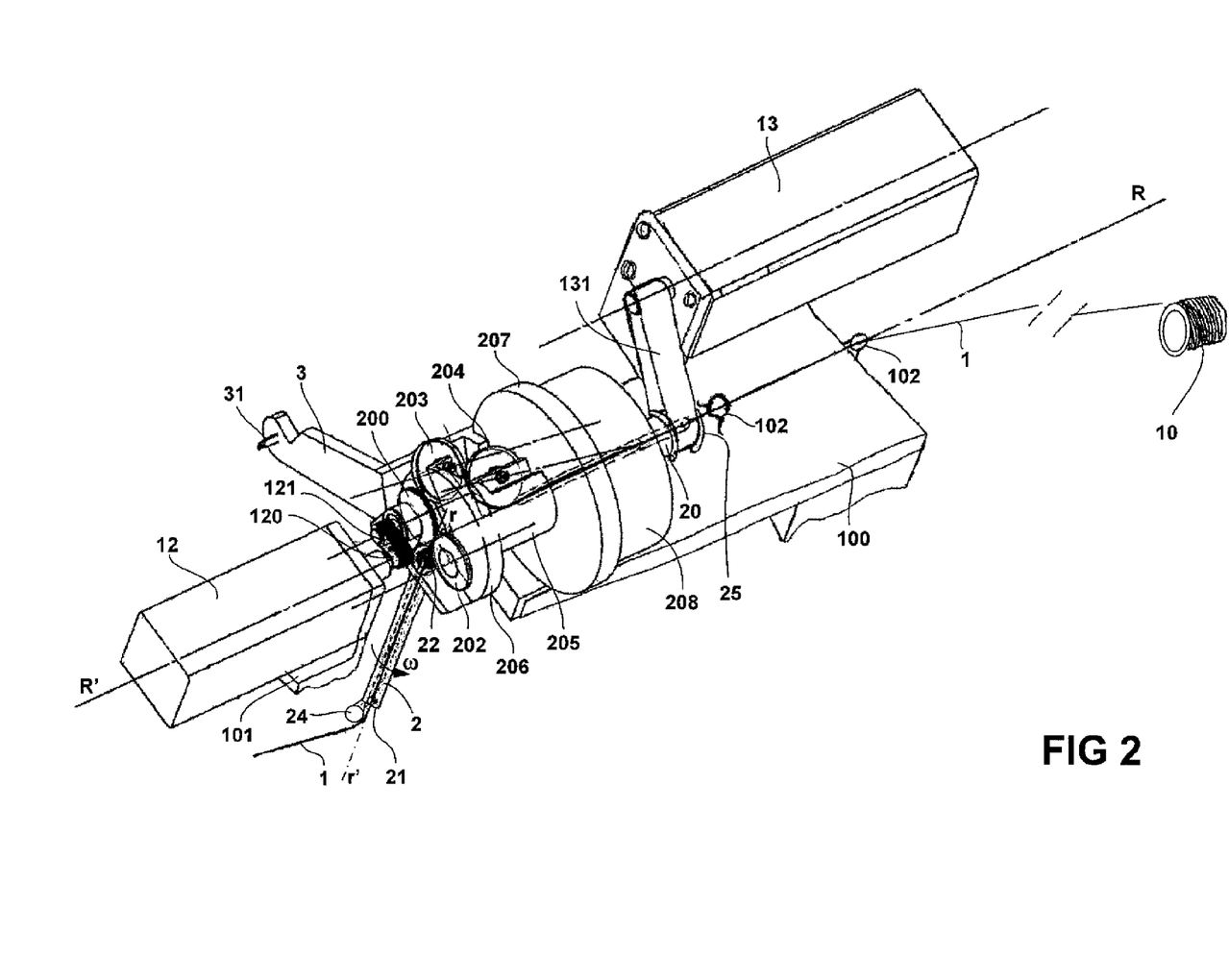
FIG. 2 depicts a schematic view of a laying device according to a first embodiment of the invention.
Figure 3:
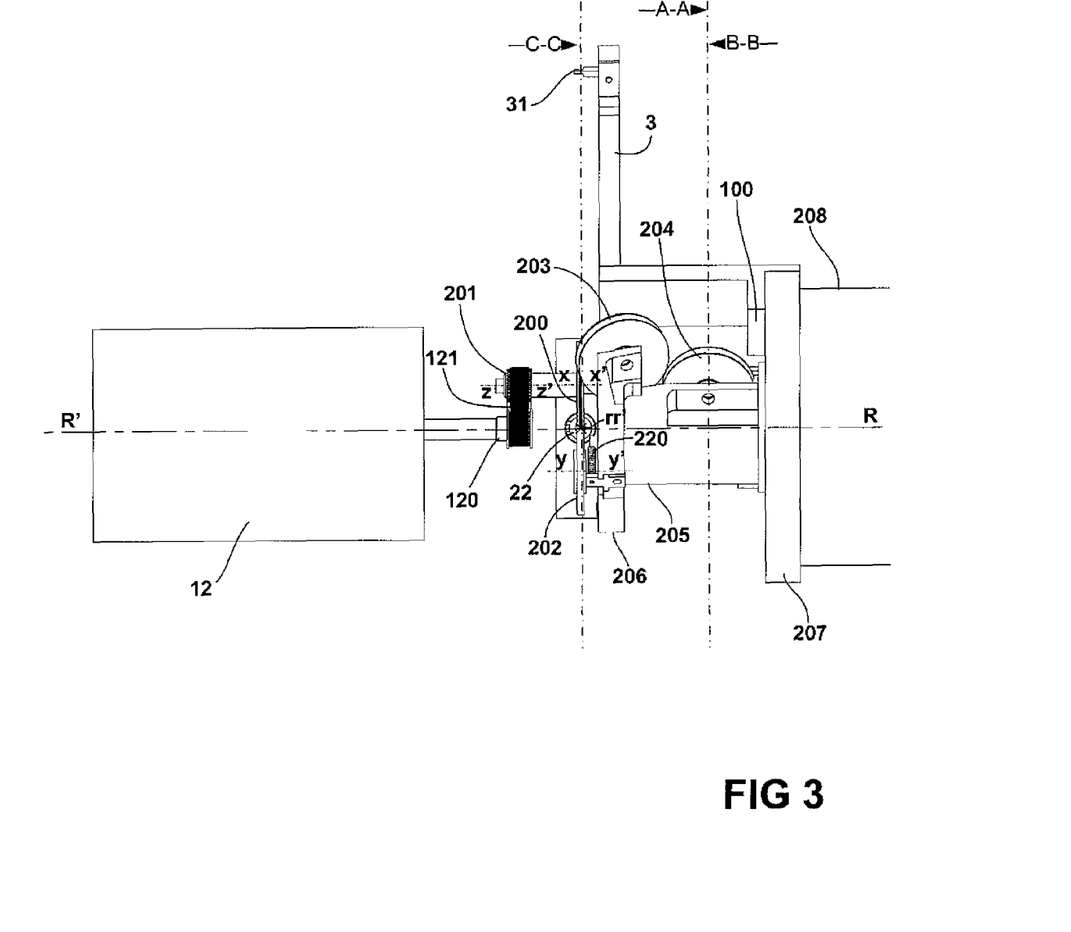
FIG. 3 depicts a view of the preceding device from above.

The device depicted in FIGS. 2 and 3 comprises a means 10 of storing the thread 1 from which the thread 1 is conveyed to the laying device. Eyelets 102 align the thread with the direction RR' of the axis of rotation of the rotary assembly carrying the rotary guide 2.

This rotary assembly comprises a hollow shaft (20, 205) running in the direction of the axis of rotation RR'. The said hollow shaft is held on a fixed frame 100 via a bearing box 208 fixed to the frame 100 by the flange 207, so as to allow the rotary assembly to rotate freely about the axis RR'. The thread 1 enters the hollow shaft via the inlet 25, following a path that coincides with the axis RR'. A flange 206 is positioned at the other end of the hollow shaft to support the mechanical elements that make up the feed means.

A first motor 13 rotates the said rotary assembly at a controlled speed ω via a belt 131.

A motorized pulley 200, the axis of rotation xx' of which is parallel to the axis RR', is positioned in such a way that its circumference is tangential to the axis rr' of the rotary guide 2 which runs in the radial direction with respect to the axis RR'.

It is therefore necessary to fit, upstream of the motorized pulley 200 when considering the direction which the thread runs, means able to cause the thread to change its path and to feed the thread 1 in a path that coincides with the axis of rotation RR' of the rotary assembly as far as the motorized pulley 200 around which the said thread is wound so as to be driven.

To do this, the thread is wound around a first pulley 204, the circumference of which is tangential to the axis of rotation RR', and then around a second pulley 203 so as to present the thread in the plane of the motorized pulley 200 around which the thread is wound and runs before entering the rotary guide 2 via the opening 22 following a path that coincides with the axis rr' of the rotary guide 2, as far as the exit 21 of the said rotary guide.

Under the effect of an elastic means such as a spring 220, a press roller 202, the axis of rotation yy' of which is parallel to the axis of rotation xx' of the motorized pulley, applies radial pressure to the circumference of the said motorized pulley 200 so as to prevent any slippage of the thread wound around the motorized pulley, and thus allow precise control over the thread feed speed.

Figure 8:
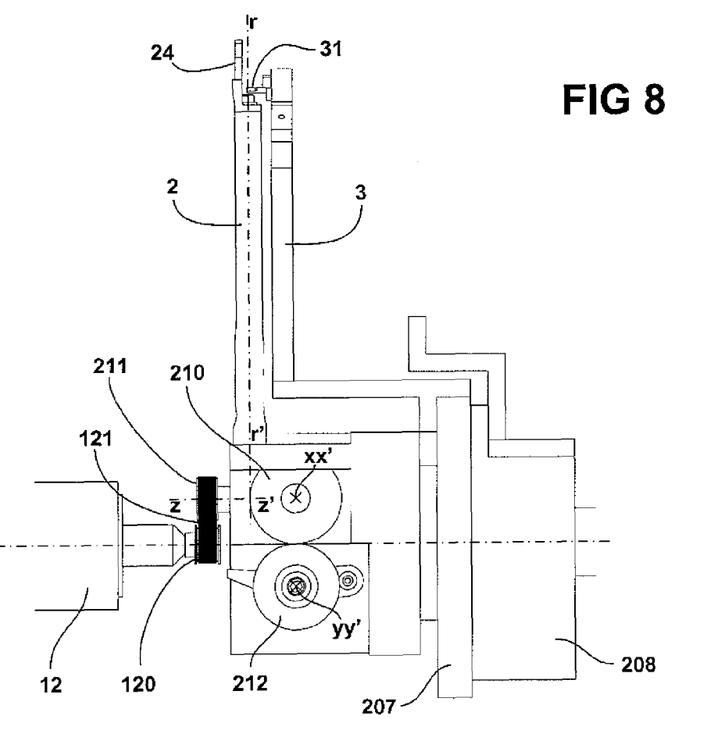
FIGS. 8 and 9 depict two positions of the on-board assembly according to an alternative embodiment.
Figure 9:
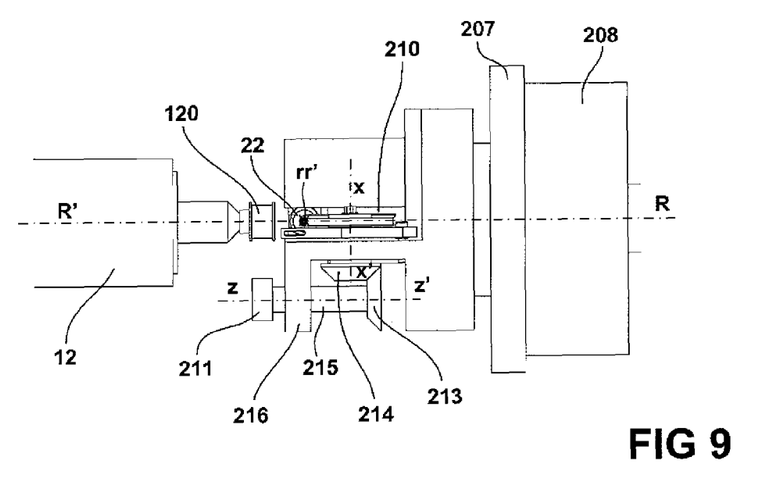

An alternative setup is illustrated in FIGS. 8 and 9 in which components identical to those described hereinabove are identified by the same identity numbers. In this alternative, the motorized pulley 210 is arranged in such a way that its circumference is simultaneously tangential to the axis of rotation RR' and to the axis of the rotary guide rr'. As a result, the axis xx' of the rotary pulley is perpendicular to the axis of rotation RR'.

According to this alternative, there is no need to deflect the path of the thread which arrives at the motorized pulley 210 directly.

According to either one of the alternatives described hereinabove, it is necessary to apply a driving torque to the shaft that carries the motorized pulley so as to impart to it the mechanical energy needed to draw the thread from the storage means.

One solution might be to fit on board the hollow shaft a rotary motor coupled mechanically to the shaft of the motorized pulley.

However, one of the constraints associated with designing and producing this laying device lies in the fact that it is necessary to reduce as far as possible the time taken for the rotary components to start to move so that, upon start-up, the first length of thread delivered during the first rotation of the guide can be cast onto the receiving surface with enough of a dynamic effect to ensure that it stays put.

What this means is that when the device is being started up, the accelerations experienced by the thread and the various moving parts are relatively high. As a result, attempts are made to reduce the masses and moments of inertia of the parts carried on board the rotary assembly so as to reduce the power of the motors.

For the reasons given hereinabove, the motor 12 that turns the motorized pulley will therefore be positioned on a stand 101 that is fixed in relation to the rotary assembly comprising the motorized pulley 200 (210) and the rotary guide 2.

The driving torque is transmitted between the drive motor 12 that is not on board and the motorized pulley 200 that is on board the rotary assembly supporting the motorized pulley by means of a drive shaft 120, the axis of which coincides with the axis of rotation RR'. This drive shaft can indifferently be supported by the drive assembly that is not on board or by the rotary assembly or by both assemblies simultaneously. However, in the latter two instances it will be appropriate to provide a set of bearings on the rotary assembly, between the drive shaft and the rotary assembly, so as to make the drive shaft independent of the rotation of the rotary assembly.

So, for the reasons of on-board mass and of moment of inertia that were mentioned hereinabove, preference is given to the solution in which the drive shaft 120 is supported by the drive assembly that is not on board, as depicted in FIGS. 2, 3, 8 and 9.

In order to transmit the drive torque to the motorized pulley from the drive shaft 120 transmission means on board the rotary assembly are provided.

When the axis xx' of the motorized pulley is parallel to the axis of rotation RR' of the rotary assembly, as is depicted in FIGS. 2 and 3 which illustrate the preferred embodiment of the invention, the transmission means may be formed of a transmission shaft 201 arranged on the rotary assembly. This transmission shaft 201, the axis of rotation zz' of which is parallel to the axis of rotation RR', may coincide with the axis xx' of the motorized pulley, and the transmission shaft 201 is then fixed directly to the motorized pulley 200.

The transmission shaft 201 is mechanically connected to the drive shaft 120 by means of a belt 121 or alternatively by toothed pinions. It is also possible to conceive of the drive shaft 120 being formed of a wheel with internal teeth of axis RR', which runs about a pinion that forms the transmission shaft 201.

According to the alternative embodiment of the invention as depicted in FIGS. 8 and 9, when the axis xx' of the motorized pulley 210 is perpendicular to the axis RR' of rotation of the rotary assembly, it is necessary to provide transmission means, such as deflecting transmission pinions 213, 214, mounted on a bearing block 216 secured to the rotary assembly, so as to transmit the drive torque from the drive shaft 120 to the motorized pulley 210 via the transmission belt 121 and the on-board transmission shaft 211, the axis zz' of which is parallel to the axis RR' and perpendicular to the axis xx'.

The means of cutting the thread comprise an arm 3 at the end of which there is arranged the blade 31 of a cutter which in collaboration with the anvil 24 parts off the length of thread for each revolution of the rotary guide.

Figure 4:
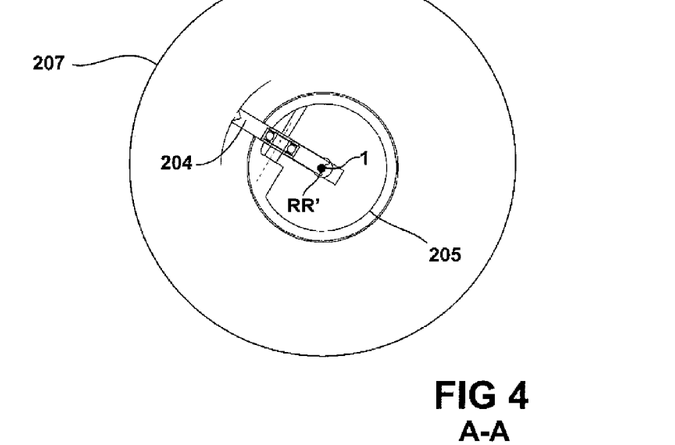
FIG. 4 depicts a side view of the said device in section on AA.
Figure 5:
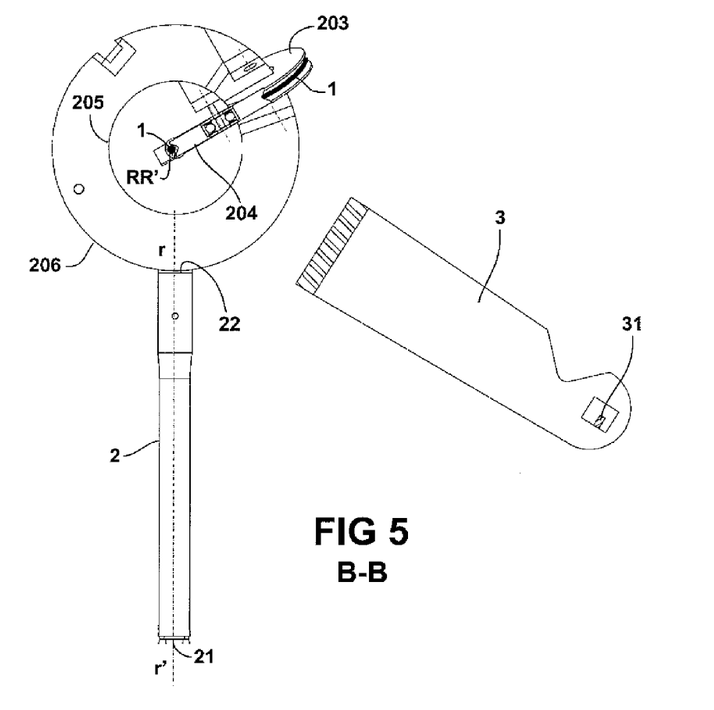
FIG. 5 depicts a side view of the said device in section on BB.
Figure 6:
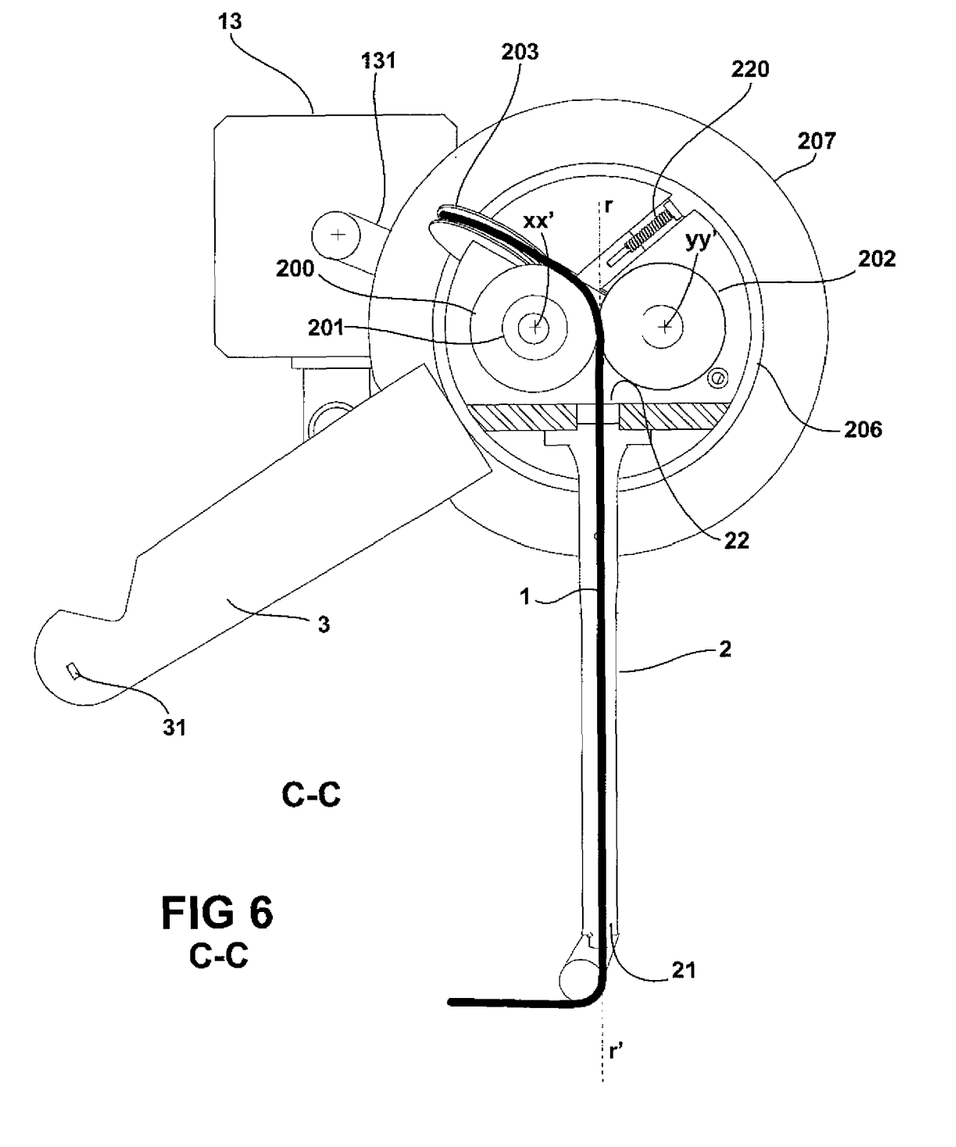
FIG. 6 depicts a side view of the said device in section on CC.

FIGS. 4, 5 and 6 are side views in section on A-A, B-B and C-C of the device depicted in FIGS. 2 and 3, illustrating the main components of a laying device according to the invention.

These various figures also show the path of the thread 1 as it passes through the device.

Figure 7:
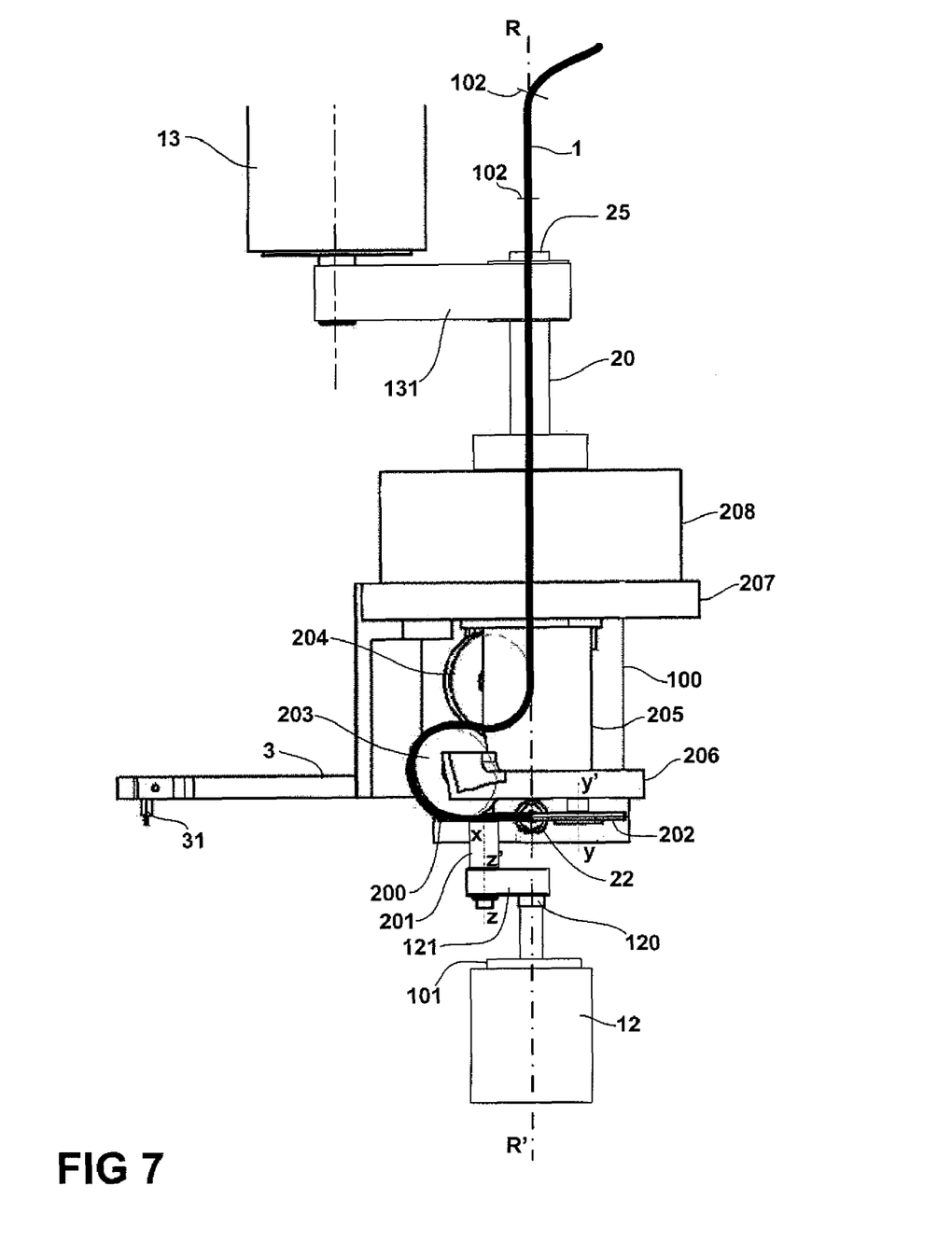
FIG. 7 depicts a plan view of the device showing the path of the thread.

FIG. 7 depicts a plan view of the path of the thread (in bold lines) which is straight through the hollow tube 20, then wound successively around the pulleys 204, 203, 200 and 202, and then straight again through the rotary guide 2.

It will be noted that these two types of setup are similar to that of an epicyclic gear train, and confer an additional advantageous benefit on the device.

Specifically, when the motor 13 rotates the rotary assembly, it rotates the hollow shaft 20, 205 and the guide 2 about the axis RR'. From this moment on, if the rotary motor 12 remains stationary and the drive shaft 120 is prevented from turning, the motorized pulley 200 (210) is driven by the mechanical connection between the motorized pulley and the shaft 120 which is halted, and rotates about its xx'.

The motorized pulley will therefore feed a length of thread equal to the length of the development of its circumference multiplied by the number of revolutions it makes during this 360° rotation of the rotary assembly.

As the device is started up, and during the first revolution performed by the rotary guide, the problems of the acceleration of the feed means are minimized inasmuch as the acceleration of the motorized pulley takes place as the result of a combination of, on the one hand, the drive motor 13 driving the rotary assembly and, on the other hand, the drive motor 12 driving the motorized pulley, as this has the effect of reducing the slippage of the thread in the groove of the motorized pulley 200.

It is also possible to select appropriately the diameter of the drive shaft 120 and of the elements that make up the on-board transmission means such as the diameter of the shaft 201 (211) or of the deflecting transmission pinions (213 and 214) as a function of the diameter of the motorized pulley 200 (210) such that, for each revolution of the rotary assembly about its axis of rotation RR', the motorized pulley effects a determined number of revolutions on itself in such a way as to feed a predetermined length of thread that corresponds precisely to the length of thread that is to be laid on the receiving surface. The motor 13 then becomes surplus to requirement. Further, the choice of the length to be laid is made by choosing the drive ratios between the shaft 120 which is fixed and the elements that form the transmission means.

The devices that form the subject of the present description correspond to a device according to the invention and in which the technological choices have been made with a view to best optimizing the said device. It goes without saying that the setup alternatives proposed will enable a similar end result to be obtained and do not in any way depart from the overall spirit of the invention.

The invention claimed is:

1. A device for manufacturing a reinforcement from a thread laid directly in its final place by casting lengths of the thread onto a receiving surface, the device comprising:
   a feed means for feeding the thread from a source of thread;
   a rotary assembly comprising a rotary guide of axis rr' fixed to a hollow shaft constituting an axis of rotation of said guide so that an outer radial end of said guide is directed substantially radially with respect to the axis of rotation of the hollow shaft, said guide receiving the thread that comes from said feed means via its central end that is the opposite end to said outer radial end, the thread leaving via said outer radial end, said feed means controlling a linear speed at which the thread advances inside said rotary guide;
   means for rotating the hollow shaft;
   means for cutting the thread, acting on the thread in such a way as to part off one length for each revolution of the said rotary guide;
   wherein the said feed means comprises a motorized pulley, borne by the hollow shaft, the circumference of which is tangential to the axis of the rotary guide, and about which pulley the thread is wound before it directly enters the inlet of the rotary guide when the device is in operation.

2. The device according to claim 1, wherein the driving torque is transmitted to said motorized pulley by a rotary motor positioned on a stand that is fixed in relation to the rotary assembly.

3. The device according to claim 2, wherein the driving torque is transmitted, via a drive shaft the axis of which coincides with the axis of rotation of said rotary assembly, to rotary transmission means with an axis positioned on said rotary assembly and mechanically connected to said motorized pulley.

4. The device according to claim 3, wherein the axis of the rotary transmission means is parallel to the axis of rotation of said rotary assembly.

5. The device according to claim 4, wherein the driving torque is transmitted between the drive shaft and said rotary transmission means by a belt.

6. The device according to claim 4, wherein the driving force is transmitted between the drive shaft and the transmission means via toothed pinions.

7. The device according to claim 4, wherein the axis of rotation of the motorized pulley is parallel to the axis of rotation of said rotary assembly.

8. The device according to claim 7, wherein the axis of said rotary transmission means coincides with the axis of the motorized pulley.

9. The device according to claim 7, wherein deflecting transmission pulleys positioned on hollow shafts are arranged in such a way that they lead the thread from a direction that coincides with the axis of rotation of the rotary assembly as far as the motorized pulley around which the thread is wound before it enters the rotary guide.

10. The device according to claim 4, wherein the axis of rotation of the motorized pulley is perpendicular to the axis of rotation of the rotary assembly, and wherein the circumference of the motorized pulley is also tangential to the axis of rotation of the rotary assembly and to the axis of the rotary guide.

11. The device according to claim 10, wherein the rotary transmission means are formed by deflecting transmission pinions.

12. The device according to claim 4, wherein the drive shaft is unable to rotate, and wherein the diameter of the drive shaft and the diameter of the elements that form the rotary transmission means are tailored to the diameter of the motorized pulley so that, for each revolution of the rotary assembly about its axis of rotation, the number of revolutions effected by said motorized pulley feeds a predetermined length of thread.

13. The device according to claim 1, wherein a press roller, free to rotate about its axis of rotation parallel to the axis of rotation of the motorized pulley, applies radial pressure to the circumference of the motorized pulley under the action of an elastic element.

* * * * *